Patented Sept. 29, 1942

2,296,837

UNITED STATES PATENT OFFICE 2,296,837

VINYL ESTERS AND VINYL ESTER INTERCHANGE PROCESS

Loring Coes, Jr., Brookfield, Mass., assignor, by mesne assignments, to E. I. du Pont de Nemours & Company, Wilmington, Del., a corporation of Delaware No Drawing. Application February 23, 1939, Serial No. 257,961

11 Claims. (Cl. 260—83)

The invention relates to esters and a process for producing them.

One object of the invention is to provide an expeditious and facile method of synthesizing certain esters. Another object of the invention is to produce a new class of polymers. Another object of the invention is to produce certain new esters. Another object of the invention is to provide a simple method of making such compounds as vinyl methacrylate, ethylidene dimethacrylate, and homologues of such compounds. Another object of the invention is to produce new compounds capable of polymerization exemplified by ethylidene acetate methacrylate.

Another object of the invention is to synthesize certain esters without using acetylene. Another object of the invention is to provide a method of producing certain esters, which method gives superior yields. Another object of the invention is to produce certain esters more cheaply.

Another object of the invention is to produce a relatively hard organic bond for grinding wheels and other abrasive products. Another object of the invention is to provide a colorless optical resin which is hard enough to resist most types of abrasion met with in actual practice. Other objects will be in part obvious or in part pointed out hereinafter.

The invention accordingly consists in the combinations of elements, in the molecular structure, and in the several steps and relation and order of each of said steps to one or more of the others thereof, all as will be illustratively described herein, and the scope of the application of which will be indicated in the following claims.

A mercury sulphate catalyst suspended in acetic acid was made by dissolving 10 grams of red HgO in 100 cc. of glacial acetic acid followed by subsequent precipitation with 6.6 cc. of concentrated sulphuric acid at a temperature of 85° C. The catalyst was allowed to settle and the supernatant acetic acid was drawn off by suction. A volume of methacrylic acid equal to the volume of acetic acid remaining with the catalyst (60 cc.) was then added and the catalyst again allowed to settle and the supernatant liquid drawn off. This procedure was repeated until the flask contained 15 cc. of acetic acid and 105 cc. of methacrylic acid. Two hundred cubic centimeters of methacrylic acid and 200 cc. of vinyl acetate together with 2 grams of pyrogallol as an inhibitor were then added, and the mixture was stirred at room temperature for one hour. At the end of this time the catalyst had completely dissolved. The mixture was then allowed to stand for twenty-four hours at room temperature and was then poured into water. The acids were neutralized with sodium carbonate. The mixture of esters was extracted with ether and the ether solution dried over sodium sulphate.

The solution was then fractionated and the fractions collected are shown in the following table:

|  | Quantity | Boiling point |
|---|---|---|
|  | Cubic centimeters | Degrees |
| (1) Vinyl acetate | 25 | 42–52 (120 mm.) |
| (2) Vinyl methacrylate | 40 | 42–52 (60 mm.) |
| (3) Ethylidene diacetate | 10 | 65–75 (15 mm.) |
| (4) Ethylidene acetate methacrylate | 15 | 65–75 (6 mm.) |
| (5) Ethylidene dimethacrylate | 20 | 80–90 (6 mm.) |

In similar fashion I can take any vinyl ester and react it with any organic acid in the presence of a reaction catalyst capable of catalyzing the production of such vinyl ester from acetylene and synthesize in a single reaction three ethylidene glycol esters and a vinyl ester different from the starting vinyl ester. In the above table vinyl acetate is the starting ester. Vinyl methacrylate is a vinyl ester different from the starting vinyl ester. The rest of the compounds, namely ethylidene diacetate, ethylidene acetate methacrylate, and ethylidene dimethacrylate, are properly described as ethylidene glycol esters since they are esters of the hypothetical ethylidene glycol.

The ethylidene acetate methacrylate is believed to be novel. In its monomeric form its formula may be written:

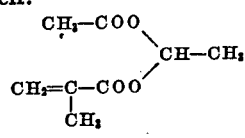

It polymerizes readily to a hard transparent mass which is useful for the production of optical bodies, the manufacture of inter-layer glass material, for windows and the like, and as a bond for abrasive articles. It is not only clear, colorless and transparent but also somewhat flexible and can be molded to desired shapes. It may be modified with various cross-linking agents, for example with vinyl methacrylate or ethylidene dimethacrylate which were mentioned in the foregoing table. In order to produce an interpolymer of ethylidene acetate methacrylate with a suitable cross-linking agent, the monomeric substances are mixed. Suitable cross-linking agents have a plurality of polymerizable double or triple bonds and when ethylidene acetate methacrylate is polymerized with one of them, a polymer results which is harder than ethylidene acetate methacrylate itself. Suitable cross-linking agents for polymerizable unsaturated methacrylate compounds are disclosed in copending applications of Samuel S. Kistler and Carl E. Barnes, filed January 28, 1938, Serial Nos. 187,546, 187,547 and 187,548, and also copending applications of Carl E. Barnes, filed January 30, 1939, Serial Nos. 253,624 and 253,625. The cross-linking agents disclosed in the application Serial No. 187,546 are the esters of acrylic or methacrylic acids with ethylene glycol, diethylene glycol, triethylene glycol, glycerol, pentaglycerol, triglycerol, pentaerithritol, manitol, and allyl alcohol. The cross-linking agents disclosed in the application Serial No. 187,547 are the above and also acrylic and methacrylic acids. The cross-linking agents disclosed in the application Serial No. 187,548 include the allyl esters of acrylic and methacrylic acids. In the Barnes applications, Serial Nos. 253,624 and 253,625, the anhydrides of acrylic and methacrylic acids are shown to be effective cross-linking agents. All of these applications are owned by the assignee of my present invention. Furthermore, the ethylidene acetate methacrylate may have its index of refraction changed by the addition thereto of styrene or other index modifiers. In application Serial No. 206,684, filed May 7, 1938, by Carl E. Barnes, the acrylic and methacrylic acid esters of the hydroxyquinolines, the nitrophenols, the chlorophenols, triphenyl methyl methacrylate, styrene, nitro-ethylene, ortho nitro styrene, meta nitro styrene, and para nitro styrene are specified as suitable index of refraction modifiers. In the application of Carl E. Barnes, Serial No. 253,625, filed January 30, 1939, some of the above index refraction changing agents are mentioned and also others, such as vinyl chloride, vinyl acetate, furyl vinyl ketone, and triphenyl benzene. In the application of Carl E. Barnes, Serial No. 254,228, filed February 2, 1939, the following soluble, inert, non-polymerizable, organic compounds which are suitable for modifying the refractive index of polymers such as those of the present invention are given:

| Compound | Index of refraction |
|---|---|
| Naphthalene | 1.582 |
| Acenaphthene | 1.60 |
| Anthracene | 1.657 |
| Phenanthrene | 1.657 |
| Pyrene |  |
| Triphenylbenzene | 1.75 |
| Chlorinated naphthalene |  |
| 1-chloroanthracene | 1.696 |
| 9-methylanthracene | 1.696 |
| 9-ethylanthracene | 1.676 |
| Alpha methyl anthracene | 1.68 |
| 1,6-naphthylenediamine | 1.708 |
| 1,8-naphthylenediamine | 1.683 |
| Alpha naphthylamine | 1.670 |
| Ethyl beta naphthylamine | 1.654 |
| Ethyl alpha naphthylamine | 1.648 |
| Diemethyl beta-naphthylamine | 1.644 |
| Diethyl beta-naphthylamine | 1.632 |
| 1,2-dichloronaphthylamine | 1.634 |
| 1,4-dichloronaphthylamine | 1.623 |
| 1,7-dichloronaphthylamine | 1.610 |
| 1,8-dichloronaphthylamine | 1.624 |
| Methyl alpha-naphthyl ether | 1.623 |
| 1,1-diphenyl ethylene | 1.610 |
| Beta chloronaphthalene | 1.608 |
| Beta methylnaphthalene | 1.603 |
| Alpha chloronaphthalene | 1.633 |
| Beta chloronaphthalene | 1.608 |
| 8-methyl quinoline | 1.616 |
| 7-methyl quinoline | 1.615 |
| Chlorinated diphenyls |  |
| Tetra- and hexachlorbenzene |  |
| Hexachlordiphenyl oxide |  |

In another application of Carl E. Barnes, Serial No. 254,229, filed February 2, 1939, there is disclosure of some of the above compounds to change the index of refraction of transparent resins and also ortho hydroxy diphenyl methacrylate, the copolymer of vinyl acetate and vinyl chloride, methyl vinyl ketone, methyl isopropenyl ketone, diphenyl ketone, and phenyl vinyl ketone. The above applications also are owned by the assignee of the present invention.

Of the two above-mentioned polymerizable esters which are suitable cross-linking agents, the ethylidene dimethacrylate is believed to be a novel composition of matter but is claimed in my prior copending application Serial No. 239,533, filed November 8, 1938.

As examples of other vinyl esters which may be substituted for vinyl acetate in the process of the example given above, and to produce other novel ethylidene glycol esters, I may use vinyl acetate, vinyl formate, vinyl propionate, vinyl butyrate or vinyl chloroacetate.

In place of methacrylic acid I may use any organic acid, for example propionic, butyric, acrylic and substituted acrylic acids other than methyl, for example ethyl. It should be understood, however, that in order to obtain ethylidene glycol esters which are polymerizable, I use polymerizable acids such as acrylic and substituted acrylic acids. The process of my invention, however, may be employed to produce other than polymerizable compounds.

As catalysts other than mercuric sulphate, I may use other mercuric salts or boron trifluoride, but any catalyst which is capable of catalyzing the product of the starting vinyl ester from acetylene may be used.

As identification of the substances shown in the table, I give the following formulae identified by the numbers which will be found in the table:

(1) $CH_3-COOCH=CH_2$ (2) $CH_2=C(CH_3)-COOCH=CH_2$

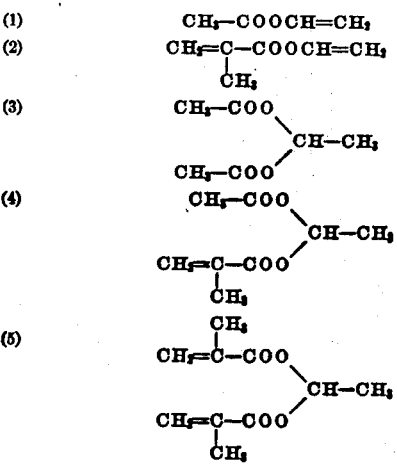

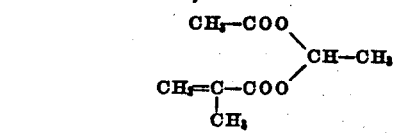

In the formula,

I may substitute hydrogen or any other alkyl group for the methyl group of the bottom line. Furthermore, in the top line of the formula I may substitute hydrogen or any alkyl group for the methyl group. Any such substituted products will likewise be polymerizable.

It will thus be seen that there has been provided by this invention a novel method and novel compositions of matter in which the various objects hereinabove set forth together with many thoroughly practical advantages are successfully achieved. As various possible embodiments might be made of the compositions of the above invention and as the art herein described may be varied in various parts, all without departing from the scope of the invention, it is to be understood that all matter hereinbefore set forth is to be interpreted as illustrative and not in a limiting sense.

I claim:

1. As a composition of matter, monomeric ethylidene acetate methacrylate,

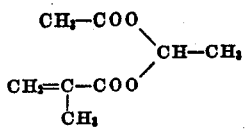

2. As a composition of matter, polymeric ethylidene acetate methacrylate polymerized from the monomer of claim 1.

3. As a composition of matter, monomeric ethylidene acetate acrylate,

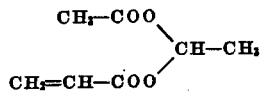

4. As a composition of matter, monomeric

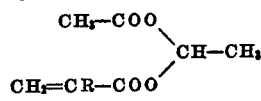

where R is selected from the group consisting of hydrogen and methyl.

5. As a composition of matter, the polymer produced by polymerizing the monomer of claim 4.

6. As a composition of matter, monomeric

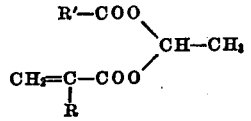

where R is selected from the group consisting of hydrogen and methyl and R' is selected from the group consisting of hydrogen and alkyl.

7. As a composition of matter, the polymer produced by polymerizing the monomer of claim 6.

8. Process of producing esters in a single reaction which comprises using a catalyst capable of catalyzing the production of a vinyl ester of a carboxylic acid from a carboxylic acid and acetylene, and reacting a vinyl ester of a carboxylic acid with methacrylic acid in the presence of such catalyst and thereby producing three ethylidene glycol esters and vinyl methacrylate.

9. Process of producing esters in a single reaction which comprises using a catalyst capable of catalyzing the production of a vinyl ester from a carboxylic acid and acetylene, and reacting vinyl acetate with methacrylic acid in the presence of such catalyst and thereby producing three ethylidene glycol esters and vinyl methacrylate.

10. Process of producing esters in a single reaction which comprises reacting vinyl acetate with methacrylic acid in the presence of a mercury salt as a catalyst and thereby producing three ethylidene glycol esters and vinyl methacrylate.

11. Process of producing esters in a single reaction which comprises reacting vinyl acetate with methacrylic acid in the presence of boron trifluoride as a catalyst and thereby producing three ethylidene glycol esters and vinyl methacrylate.

LORING COES, Jr.